Aug. 8, 1939.   C. A. HAHN   2,168,619
AMALGAMATOR
Filed Nov. 21, 1936   3 Sheets-Sheet 1
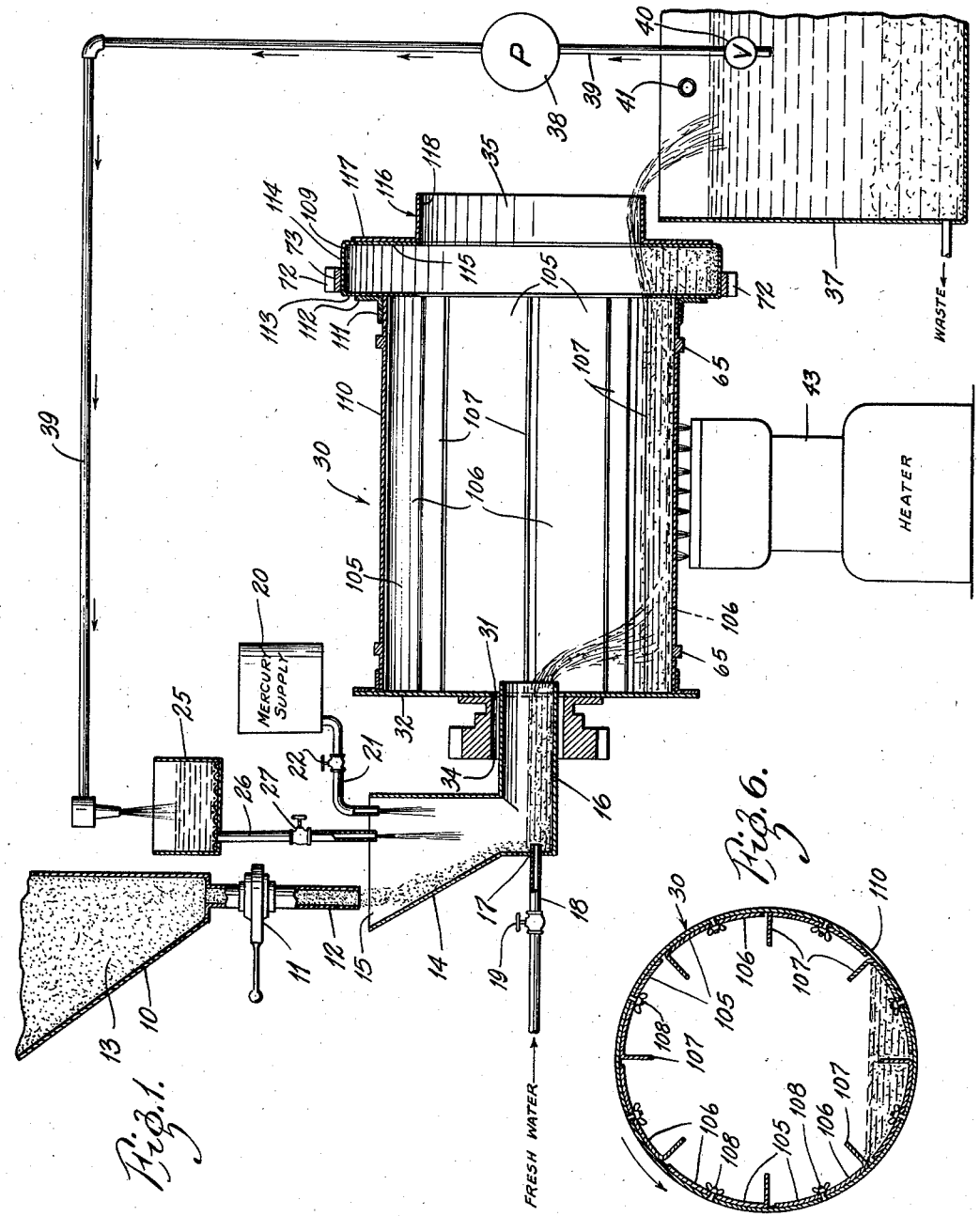
INVENTOR:
CARL A. HAHN,
By Lawrence C. Kingsland
ATTORNEY.

Aug. 8, 1939.  C. A. HAHN  2,168,619
AMALGAMATOR
Filed Nov. 21, 1936  3 Sheets-Sheet 2
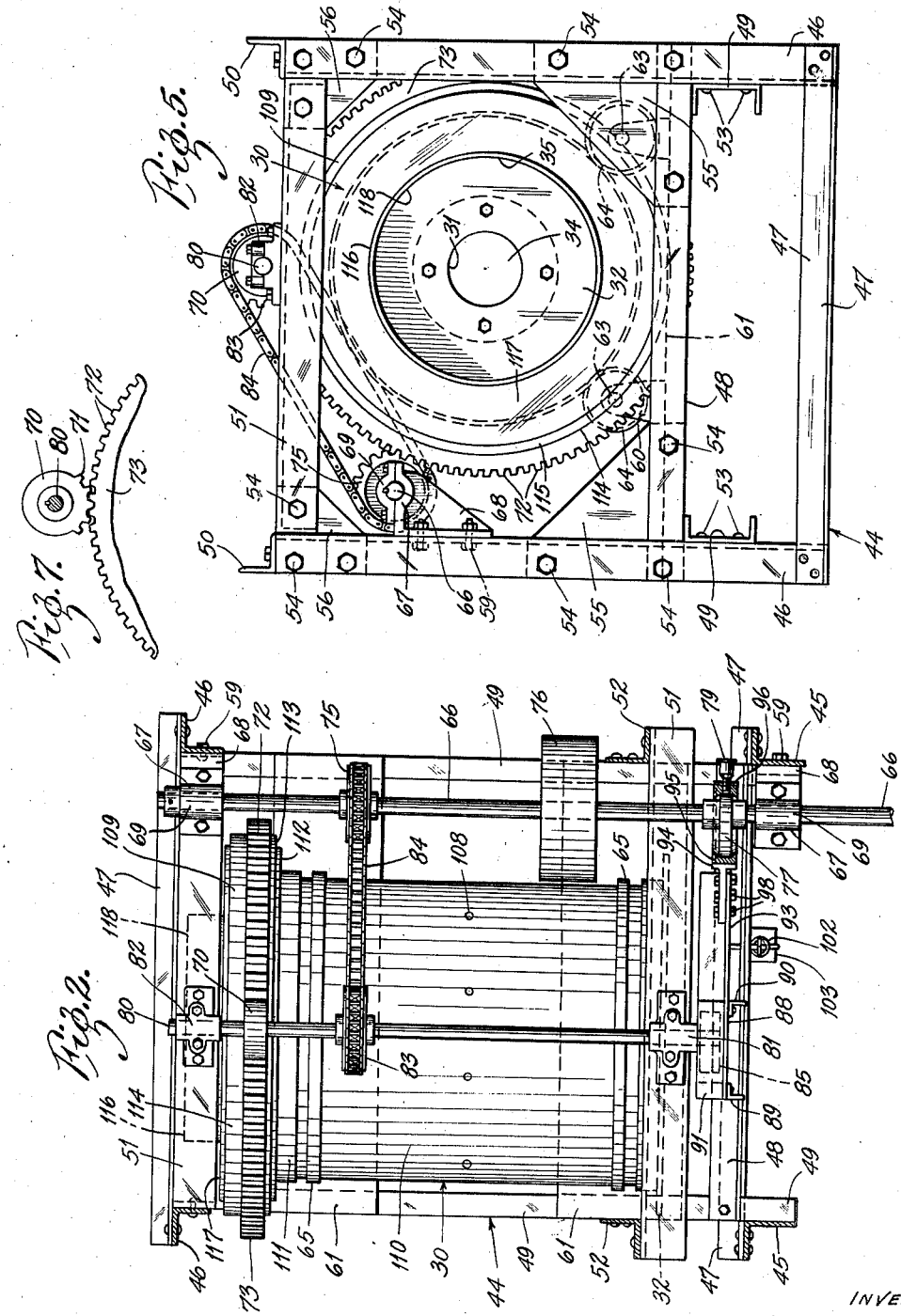
INVENTOR:
CARL A. HAHN,
BY Lawrence C. Kingsland
ATTORNEY.

Aug. 8, 1939.   C. A. HAHN   2,168,619
AMALGAMATOR
Filed Nov. 21, 1936   3 Sheets-Sheet 3
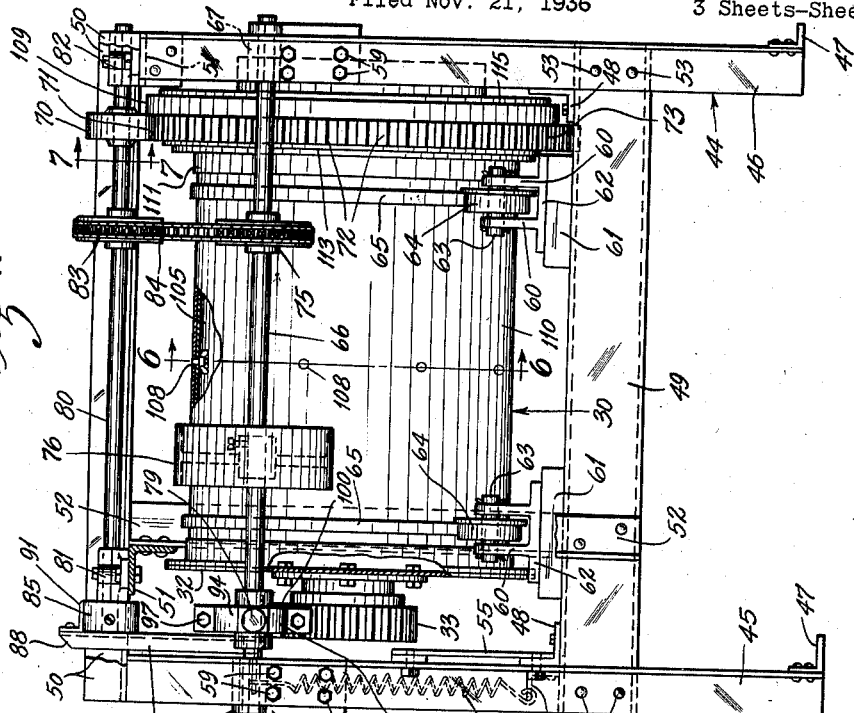
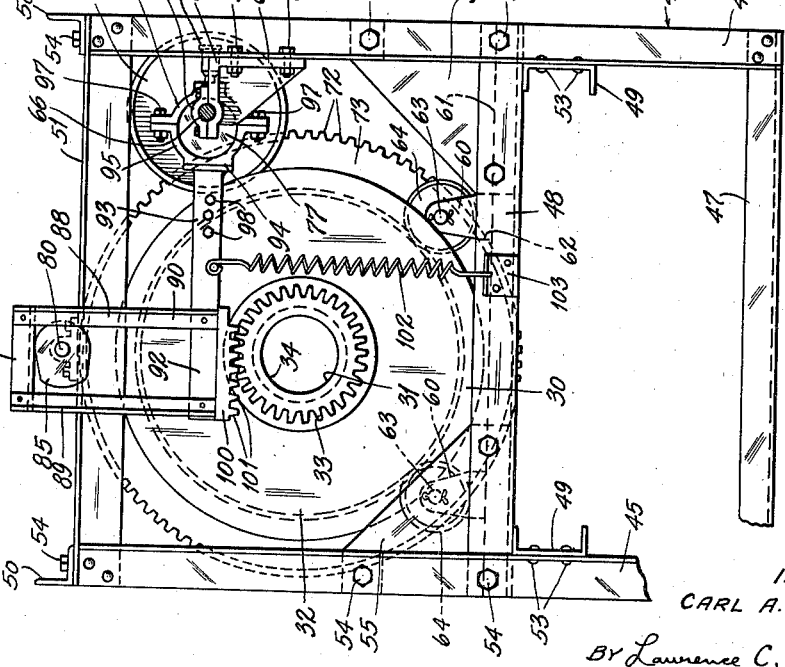
INVENTOR:
CARL A. HAHN,
BY Lawrence C. Kingsland
ATTORNEY.

Patented Aug. 8, 1939

2,168,619

UNITED STATES PATENT OFFICE 2,168,619

AMALGAMATOR

Carl A. Hahn, Kirkwood, Mo.

Application November 21, 1936, Serial No. 112,166

6 Claims. (Cl. 209—198)

The present invention relates generally to amalgamators, and more particularly to a rotary-impact amalgamator for the extraction of gold or other metals.

An object of the present invention is to provide an amalgamation apparatus in which an amalgamator drum is subjected successively to rotary and to rocking movements.

Another object is to provide a device for use in the amalgamation of gold, or the like, which includes elements for effectively and efficiently extracting the said gold, or the like, from its ore.

Another object is to provide an amalgamator drum which includes removable plates presenting a large area for the amalgamation of gold, and the like.

Another object is to provide an amalgamator including a circumferential trap for processing materials which escape unprocessed from the main body of the amalgamator.

Another object is to provide, in combination, an amalgamator and a heater.

Other objects and advantages will be apparent from the following description, taken in conjunction with the accompanying drawings, in which—

Fig. 1 is a schematic view of an amalgamation apparatus.

Fig. 2 is a plan view of an amalgamator drum constructed in line with the present invention, certain parts of the supporting frame being broken away for clarity.

Fig. 3 is an end elevation of the device shown in Fig. 2.

Fig. 4 is a side elevation of the device shown in Fig. 2, certain elements being broken away to more clearly illustrate the invention.

Fig. 5 is an end elevation, opposite from that of Fig. 3, of the device shown in Fig. 2.

Fig. 6 is a section on the line 6—6 of Fig. 4.

Fig. 7 is a section on the line 7—7 of Fig. 4.

Referring more particularly to the drawings by reference numerals, there is shown in Fig. 1 an amalgamation apparatus for the recovery of gold, or other metals, from crushed ore, concentrates, and the like. A supply hopper 10 having a regulating valve 11 and a discharge pipe 12 is suitably supported in a position to supply crushed ore 13, or the like, to a feed hopper 14. The feed hopper 14 includes a funnel-shaped receiving mouth 15 and a cylindrical discharge portion 16, which is turned at an angle to the receiving mouth 15. The feed hopper 14 has an opening 17 at the base of the funnel to receive one end of a fresh water supply pipe 18, which has a regulating valve 19.

A receptacle 20 for holding mercury is disposed above the feed hopper 14 and has a pipe 21 including a regulation valve 22 for supplying mercury into the feed hopper at the mouth 15. Likewise disposed above for discharge of its contents into the feed hopper 14 is a receptacle 25 having a discharge pipe 26 including a control valve 27, the purpose of which will be subsequently described.

A drum, generally indicated 30, is supported in cooperative relation to the feed hopper 14 at a predetermined angle to the horizontal to secure gravity flow of material therethrough. The details of the drum 30 comprise an essential part of the present invention and will be described below. To establish the relation of the drum relative to the other working parts of the amalgamation apparatus, it is sufficient to say that it includes an opening 31 in an end plate 32 to which is fixed a gear 33 having an opening 34 therethrough. The cylindrical portion 16 of the feed hopper 14 is adapted to extend through the openings 34 and 31 into the interior of the drum 30. At the end of the drum remote from the plate 32 there is a large circular opening 35 by means of which material passing into the drum may exit.

A large receptacle 37 is disposed beneath the opening 35 to receive the material flowing from the drum 30. A pump 38 and a recirculation pipe line 39 are disposed adjacent the receptacle 37 to convey the liquid used in the amalgamation process from the receptacle 37 to the above mentioned receptacle 25. The pipe 39 includes a valve 40. An overflow 41 is provided in a wall of the receptacle 37 adjacent the top for the purpose of carrying away surplus material. A heater 43 is disposed beneath the drum 30 for the purpose of heating materials therewithin for certain recovery purposes.

Of course, suitable supporting means are supplied for the aforementioned elements. As stated, the drum 30 is usually located at a predetermined angle to the horizontal, inasmuch as the passage of all materials through the apparatus is effected primarily by gravity.

Referring more particularly to Figs. 2–5, there is disclosed a preferred embodiment of an amalgamator drum and support constructed in line with the present invention. A suitable metal framework, generally designated 44, supports the drum 30 and its associated operating elements. As disclosed, the frame 44 includes four corner angle bar uprights, the two longer of which are designated 45 and the two shorter 46, two bottom transverse bracing angle bars 47, intermediate transverse angle bars 48, longitudinal main beams 49, longitudinal top bracing angle bars 50, two top transverse angle bars 51, and vertical bracing angle bars 52. The main beams 49 are shown as fixed to the uprights 46 by rivets 53, but these connections may be by bolts, or otherwise. The remaining bars are interconnected by bolts 54, or the like, gusset plates 55 and 56 being used at certain points to reinforce the frame. The supporting frame may be varied over a wide range as to material, the type of bars, and the specific assemblage of the elements, but that disclosed has been demonstrated as satisfactory.

Two beams 61 of rectangular cross-section of metal or wood are supported by the main beams 49. Each beam 61 carries two U-shaped members 62, the legs 60 of each of which serve as bearings for a stub shaft 63, upon which is journaled a flanged wheel 64. The four flanged wheels 64 are disposed in positions adapted to cooperate with peripheral flanges 65 around the outside of the drum 30 to support the drum for rotation.

A longitudinally extending drive shaft 66 is supported on two of the uprights 46 by bearings 67. Each bearing 67 includes an angle member 68 and a shaft retaining member 69. Bolts 59, or the like, secure the members in cooperative relation relative to the shaft 66, and the member 68 to an upright 46.

To an intermediate position of the shaft 66 there is fixed a sprocket 75, the function of which will be subsequently described. Likewise fixed to the shaft 66 at an intermediate position is a balance wheel 76 which may be omitted if preferable. Further, at a position on the shaft 66 adjacent that end of the drum having the plate 32, there is fixed an eccentric 77, the function of which will be presently described.

A shaft 80 is journaled in split bearings 81 and 82 which are supported at opposite ends of the drum by the upper transverse frame members 51. Adjacent and fixed to that end of the shaft 80 disposed remote from the gear 33 is a gear sector 70 (Figs. 2 and 7), which has teeth 71 that are adapted to cooperate with teeth 72 of a gear band 73 which is fixed to a section of the drum 30 adjacent the opening 35. Intermediate the bearings 81 and 82 and spaced opposite to the sprocket 75, the shaft 80 carries fixed thereto a sprocket 83. An endless chain 84 cooperates with the sprockets 75 and 83 to transmit motion from the former to the latter. Obviously, the relative sizes of the sprocket 75 and 83 will depend upon the speed or power desired transmitted to the drum. A cam 85 (Fig. 3) is fixed at the end of the shaft 80 adjacent that end of the drum having the plate 32, and is disposed outwardly of the bearing 81.

A generally rectangularly shaped frame 88 is disposed to cooperate with the cam 85. The frame 88 includes longitudinal members 89 and 90 and transverse members 91 and 92, all of angle bar material. The transverse member 92 has an integral extension 93 that supports at its free end an eccentric guide 94, which comprises the two portions 95 and 96 bolted or otherwise secured together at 97. The eccentric guide is secured to the extension 93 by bolts 98, or the like. A grease cup 79 is connected to the eccentric guide for greasing the eccentric. A rack 100 having teeth 101 is fixed to, and exteriorly of, the transverse member 92, and is adapted to cooperatively mesh with the gear 33. A helical tension spring 102 is connected to an angle bracket 103 fixed to the angle bar 48 and to the extension 93 to hold the rack 100 firmly meshed with the gear 33 when operatively engaged and to draw said elements quickly into engagement as the cam 85 turns.

Interiorly of the drum 30 are elongated removable copper plates, generally designated 105, each of which includes an arc portion 106 adapted to snugly fit against a corresponding arc of the interior circumference of the drum 30, and a radially disposed portion 107. These plates 105 are maintained in fixed position relative to the drum by means of screws 108, or the like, and provide a large mercury carrying surface.

At that end of the drum remote from the plate 32 there is provided a trap which comprises a circular member 109 of U-shaped cross-section (Fig. 1) that is connected to the cylindrical portion 110 of the drum 30 by means of the circular angle bar 111, which has one leg 112 abutting a leg 113 of the circular member 109. The bight 114 of the member 109 is adapted to support the aforementioned gear band 73. A circular member 116 having a flat portion 117 and a flanged portion 118 is connected to the circular member 109, the flat portion 117 abutting a leg 115 of the circular member 109. The flanged portion 118 defines the above mentioned opening 35. Mercury is placed in the member 109 for "clean-up" amalgamation purposes. Of course, this attached trap may be formed as an integral portion of the drum body, if desired.

*Operation*

The materials 13 to be processed by the amalgamation apparatus, such as crushed ore, concentrates, and the like, in a prepared state, are delivered to the supply hopper 10, whence they pass by gravity to the feed hopper 14, the amount passing to the latter depending upon the set of the regulating valve 11. Fresh water, mercury, any desired chemicals, and recirculated solution are admitted into the feed hopper 14 in suitable predetermined quantities along with the material 13. By gravity, all of the aforementioned materials and liquids pass from the cylindrical portion 16 of the feed hopper 14 into the drum 30. The plates 105 within the drum 30 have been previously treated with mercury. The materials 13 come in contact with the plates 105 of the drum 30 due to alternate rotary and rocking movement of the drum by means of the detailed drive mechanism. The rotary motion is produced by the teeth 71 of the gear sector 70 intermittently engaging the teeth 72 of the gear band 73, the gear sector 70, of course, being driven by the power shaft 66. The source of power for the shaft 66 and the connections thereto are not disclosed, inasmuch as it is obvious that any desired type of power mechanism and connections may be employed.

The rocking movement of the drum 30 is produced by the rack 100 and its driving eccentric 77 cooperating with the gear 33. The rack 100 and its driving eccentric 77 are so coordinated with the gear sector 70 that there is continuous alternate operation of these driven elements. Such coordination is established by means of the cam 85 which rides underneath the transverse member 91 to raise and maintain out of engagement with the gear 33 the rack 100 during the interval that the teeth 71 of the gear sector are in engagement with the gear 72 of the gear band 73. As can be readily appreciated from Figs. 2 and 5, the cam 85 is driven from the shaft 66 through the medium of the sprockets 75 and 83 and their chain 84 and the shaft 80. Thus, all of the power for the rotary and rocking movement of the drum is taken from the drive shaft 66. The rotary motion provides means for exposing all of the plates 105 within the drum 30 to the material 13 in succession, while the rocking movement brings the material into more intimate contact with the plates through impact action in the backward and forward movement of the drum during the rocking intervals.

From the cylindrical portion 110 of the drum 30, that part of the material 13 which has not become amalgamated with the mercury on the plates 105 passes into the member 109, which serves as a trap to hold mercury for amalgamating large and other ore particles which pass the plates, whence waste and liquid flow by way of the opening 35 into the receptacle 37. That which passes from the drum 30 includes any chemicals which may have been introduced into the feed hopper 14 along with the original materials 13, water, and the waste portion of the processed material. The waste material passes to the bottom of the receptacle 37 and may be removed by any convenient method. The liquid remains at the top and preferably is passed back to the receptacle 25 for use with additional material by means of the pump 38 in the pipe line 39. Should it become necessary to heat materials during processing, the heater 43 may be used, it being disposed directly beneath the drum 30 to avoid loss of heat value.

It is thus apparent that there has been provided an apparatus for amalgamating gold, and the like, with mercury which is adapted to achieve and effectuate all of the advantages and purposes sought in the present invention. It is to be understood that the invention is not limited by the above description and accompanying drawings, which have been given by way of illustration and example, but is limited only by the following claims.

What I claim is:

1. In a device of the kind described, an amalgamator drum, means for supporting the drum for movement about its longitudinal axis, means for rocking said drum including a gear fixed to one end of the drum, a rack cooperating with the gear, a drive shaft, an eccentric fixed to the shaft, an eccentric housing fixed to the rack and engaging the eccentric, means for rotating the drum including a second shaft, a gear sector fixed to the second shaft and a gear band concentric of and fixed to the drum, and automatically operable means for synchronizing the said rocking and rotary movement to alternately rock and rotate the drum.

2. In a device of the kind described, an amalgamator drum, means for supporting the drum for movement about its longitudinal axis, means for rocking said drum including a gear fixed to one end of the drum, a rack cooperating with the gear, a drive shaft, an eccentric fixed to the shaft, an eccentric housing fixed to the rack and engaging the eccentric, means for rotating the drum including a gear sector fixed to the shaft and a gear band concentric of and fixed to the drum, and means for synchronizing the said rocking and rotary movement including a second shaft mounted on the support, a sprocket mounted on the said second shaft, a sprocket mounted on the drive shaft, an endless chain around said sprockets, a cam fixed to said second shaft in a position above the said rack and its associated gear, and a frame fixed to the rack and engaging the cam, all of said elements being interconnected so that said cam through said frame raises said rack just prior to engagement of the teeth of the gear sector with the gear band and lowers said rack into engagement with the gear just subsequent to the disengagement of the last gear tooth of the gear sector with the gear band.

3. In a device of the kind described, an amalgamator drum, means for supporting the drum for movement about its longitudinal axis, means for rocking said drum including a gear fixed to one end of the drum, a rack cooperating with the gear, a drive shaft, an eccentric fixed to the shaft, an eccentric housing fixed to the rack and engaging the eccentric, means for rotating the drum including a second shaft, a gear sector fixed to the second shaft and a gear band concentric of and fixed to the drum, and automatically operable means for synchronizing the said rocking and rotary movement to alternately rock and rotate the drum, said means including a cam fixed to the second shaft and a frame fixed to the rack, said cam being adapted through the medium of the frame to maintain the rack out of engagement with the gear during the engagements of the gear sector with the gear band.

4. In a device of the kind described, an amalgamator drum, means for supporting said drum for movement about its longitudinal axis, means for rotating said drum, means for rocking said drum, and means for automatically alternating the rotating and rocking movements of the drum, said last means including a vertically movable frame connected to said rocking means and a cam adapted to move said frame vertically at spaced intervals.

5. In a device of the kind described, an amalgamator drum, means for supporting said drum for movement about its longitudinal axis, means for rotating said drum, means for rocking said drum, and means for automatically alternating the rotating and rocking movements of the drum, said last means including a vertically movable frame connected to said rocking means and a cam adapted to move said frame vertically at spaced intervals to disconnect said rocking means, and common drive means for actuating said rotating means, said rocking means, and said automatically alternating means.

6. In a device of the kind described, an amalgamator drum, means for supporting said drum for movement about its longitudinal axis, means for rotating said drum including a gear band fixed to the drum concentric of the axis of rotation of the drum and a driven gear sector which alternately engages the gear band, rocking means including a gear fixed to the drum and a driven reciprocating rack engaging said gear, and means for automatically alternating the rotating and rocking movements of the drum including a driven cam mounted for rotation concentrically with the driver gear sector and a vertical movable frame fixed to the rack and positioned to be vertically moved by the cam to disengage the rack from the gear during the engagement of the gear sector with the gear band.

CARL A. HAHN.